United States Patent [19]
Friedman

[11] Patent Number: 6,100,341
[45] Date of Patent: Aug. 8, 2000

[54] THERMOPLASTIC SEAL AND WRAPPING FILM

[75] Inventor: Michael Friedman, Wayne, N.J.

[73] Assignee: Norton Performance Plastics Corporation, Wayne, N.J.

[21] Appl. No.: 08/992,935

[22] Filed: Dec. 17, 1997

Related U.S. Application Data

[62] Division of application No. 08/373,574, Jan. 13, 1995, Pat. No. 5,770,318.

[51] Int. Cl.$^7$ ..................................................... C08L 23/04
[52] U.S. Cl. ............................................................ 525/240
[58] Field of Search ...................................... 525/191, 240

[56] References Cited

U.S. PATENT DOCUMENTS

| | | | |
|---|---|---|---|
| 5,206,075 | 4/1993 | Hodgson | 428/216 |
| 5,605,969 | 2/1997 | Tsutsui et al. | 525/240 |
| 5,631,069 | 5/1997 | Wooster et al. | 428/220 |
| 5,770,318 | 6/1998 | Friedman | 428/500 |
| 5,792,534 | 8/1998 | De Groot et al. | 428/36.92 |

*Primary Examiner*—David W. Wu
*Assistant Examiner*—Roberto Rabago
*Attorney, Agent, or Firm*—Mary E. Porter

[57] ABSTRACT

Compositions comprising a blend of a MPEP (metallocene catalyzed polyethylene plastomer) and a MPEE (metallocene catalyzed olefin copolymer elastomer); self-adhering film materials made from a blend of these metallocene polymers; and methods of making these self-adhering film materials which are useful for sealing and wrapping applications.

12 Claims, No Drawings

THERMOPLASTIC SEAL AND WRAPPING FILM

This is a divisional of application Ser. No 08/373,574 filed on Jan. 13, 1995, now U.S. Pat. No. 5,770,318.

FIELD OF THE INVENTION

The invention relates to thermoplastic blends used to make films for sealing and wrapping.

TECHNOLOGY REVIEW

A number of thermoplastic films are used for sealing and wrapping applications in food, medical and other industries. Among these are films made of EVA (ethylene vinyl acetate), PVDC (polyvinylidene chloride), PVOH (polyvinyl alcohol). A special group of sealing and wrapping films is used to cover and seal laboratory dishes, glasses, Petri dishes, biological culture cells, and other containers by stretching the film over the vessel or item to be sealed. Film suitable for this application should possess a certain combination of the following properties: stretchability, high elongation at break, relatively low modulus, high tear resistance, high clarity, very low glass transition point (Tg) and tackiness to various surfaces such as glass, ceramic and plastics.

Two films are currently used in this type of application. PARAFILM® brand film, a wax-impregnated polyethylene supplied by American National Can Corp. and DURASEAL™ brand film, a linear low density polyethylene (LLDPE) supplied by Diversified Biotech. The PARAFILM® brand, wax-impregnated polyethylene softens at about 60° C. and dissolves in common organic solvents such as carbon tetrachloride, chloroform, phenol, benzene, hexane, etc. It is not compatible with solution microwaving and is susceptible to breakage and tearing. Other disadvantages include the fact that an interleaf paper must be removed before use and visibility is hampered because the film is only translucent. Thus, its application as a sealing and wrapping material, especially in the medical and chemical/biological research area, is somewhat limited. The DURASEAL™ brand, LLDPE, resists some solvents but is not resistant to hydrochloric acid, ammonium hydroxide, methylene chloride, acetone, toluene, or tetrahydrofuran. Although it is transparent, it hazes when stretched.

Conventional LLDPE resins are polyethylene (PE) plastic materials with densities in the 0.915–0.925 g/ccm range. A variety of resins described by the general term LLDPE differ one from another in several respects such as, the type of α-olefin used for copolymerization with ethylene; the content of the comonomer; the resin density and crystallinity, and the compositional uniformity of the copolymers. Formerly, LLDPE resins were produced in the industry with two main classes of catalysts: Ziegler-Natta catalysts based on titanium or vanadium compounds, and Phillips catalysts. The densities and crystallinities of ethylene/-olefin copolymers depend on their composition. The following classification is commonly used (ASTM D 1248–48):

| Resin | Name | Olefin cont., mol. % | Crystallinity % | Density g/ccm |
|---|---|---|---|---|
| PE of medium density | MDPE | 1–2 | 45–55 | 0.926–0.940 |
| Linear PE of low density | LLDPE | 2.5–3.5 | 30–45 | 0.915–0.925 |
| Polymer resin of very low density | VLDPE | >4.0 | <25 | <0.915 |

The last group of resins, VLDP, is usually further subdivided into PE plastomer resins with low crystallinity, 10–20%, and densities in the 0.915–0.900 g/ccm range and completely amorphous PE elastomers with densities as low as 0.860 g/ccm.

A very important breakthrough in the polymerization of olefin monomers occurred when metallocene catalyst systems were utilized in polymer chemistry on a manufacturing scale, and several new grades of thermoplastic materials produced using them were commercialized. U.S. Pat. No. 5,191,052 to Howard C. Welborn, which is herein incorporated in its entirety by reference, discloses metallocene catalyst preparations. Metallocenes. are complex combinations of a metal atom compound with cyclopentadienyl groups (Cp). The metallocene catalysts are based upon π-bonding of two Cp groups to a Group IV Transition Metal (Ti, Zr, Hf, Cr) in a "sandwich complex" type of arrangement. Neutral metallocenes ($Cp_2MCl_2$) have been known for at least three decades. The first metallocenes were reported by Breslow in 1957 and by Chien in 1958. Later, Breslow postulated that cationic Ti centers acted as the active sites for ethylene polymerization.

In 1976, Kaminsky et al. reported the use of methylaluminumoxane (MAO) as a cocatalyst with $Cp_2TiCl_2$ for the polymerization of ethylene. The use of MAO cocatalyst enhanced the catalyst's activity by several orders of magnitude. Later, many other compounds were also reported to be very useful in preparing the proposed cationic form of the metallocenes. Today, the non-stereoselective metallocenes such as $Cp_2ZrCl_2$ and its derivatives are used by Exxon and Dow for the polymerization of ethylene.

Another breakthrough was made when stereoselective metallocene compounds based on Zr complexes were invented. In 1982, this type of the catalyst was prepared by Britzinger, and in 1984 Ewen reported the first polypropylene polymerization. In 1987–1988, a new family of metallocene catalysts with commercial high activity was developed by Fina Oil and Chemical Co. In 1988, Ewen, Razavi, et al. at Fina Oil reported the synthesis and polymerization results for the metallocene catalyst system based on a Zr complex in comparison with a Hf-based complex. It was also reported that substituting the Zr with Hf resulted in lower polymer yield, lower tacticity and higher molecular weight. A number of companies developed proprietary metallocene compounds, and more than 700 patents have been issued disclosing various metallocene catalysts based on Zr, Hf, Cr and other metal complexes.

Examples of non-stereoselective and stereoselective Zr metallocenes are structurally illustrated as follows:

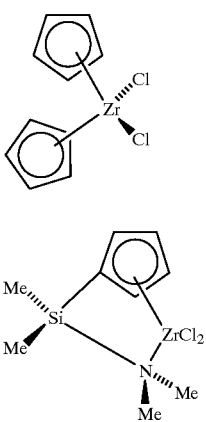

The new catalysts are known as "single site", "constrained geometry", or just "metallocenes". Regardless of the nomenclature, the catalysts behave similarly and they differ significantly in structure and reactivity from the conventional Ziegler-Natta catalysts. Some of the important differences between metallocenes and conventional Ziegler-Natta catalyst systems are summarized and listed below:

| Ziegler-Natta Catalysts | Metallocenes (single site) Catalysts |
|---|---|
| Multi-site | Single site |
| Broad MWD | Narrow MWD |
| Non-uniform chain lengths | Uniform chain lengths |
| Non-uniform comonomer distribution along the molecular chains | Very uniform comonomer distribution along the molecular chains |
| Internal & external doors | Donors not needed |
| Simple Aluminum Alkyls (triethyl aluminum chloride, or TEALC, etc.) | Methylaluminumoxane (MAO) and other ion pair species |
| Generally high bulk density | Low bulk density |
| No fouling/stickiness | Fouling/stickiness |
| High solubles (extractables) | Lower solubles (extractables) |

One unique feature of metallocene catalysts is that since they are "single site catalysts", the orientation of each monomeric unit is precisely controlled as it is added to the polymeric chains, i.e., a total control on the tacticity of the polymer. These new catalysts can be rationally tailored to produce different structures of thermoplastics such as polyethylene, polypropylene and others.

Another advantage is the extremely high productivity of metallocene systems. The super-high activity of the metallocene systems will result in product costs lower than Ziegler-Natta catalysts. In addition, the very high catalyst productivity leads to a very low contamination level of the resin with catalyst residue. The FDA has approved the use of some of the resins and film made from these resins for food contact and medical applications.

A third unique feature of the new catalysts is their ability to provide copolymerization of olefins with small amounts of higher ("heavier") α-olefins. With the old Ziegler-Natta catalysts, ethylene and propylene would totally predominate over heavier olefins. Copolymerization with heavier α-olefins opens the way to create a very large number of materials with unique properties combinations not available before. For example the types of α-olefins mostly used for copolymerization with ethylene are: 1-butene, 1-hexene, 4-methyl-1-pentene, and 1-octane. The content of these comonomers vary from 1 to 10 mol. % for different resins. This leads to a large number of grades with different density, crystallinity, and accordingly, to a very wide range of physical and mechanical properties.

The new type of LLDPE resins, produced with metallocene catalysts, introduced by Exxon Chemical Company in 1990, have a predominantly uniform compositional distribution (uniform branching distribution). All copolymer molecules in such resins have approximately the same composition. In contrast, conventionally manufactured LLDPE resins have pronounced nonuniform branching distribution and they differ significantly in physical and mechanical properties. In addition, it is important to mention that as a rule, LLDPE resins do not contain long-chain branches. However, some copolymers produced with metallocene catalysts in solution processes can contain about 0.002 long-chain branches per 100 ethylene units. Copolymers with nonuniform compositional distribution are in effect a mixture containing copolymer molecules with a broad range of compositions, from practically linear macromolecules (which usually have higher molecular weights) to short macromolecules with quite high olefin contents. Melting of such mixtures is dominated by their low-branched fractions which are highly crystalline. As a result, the melting points of conventional LLDPE resins with nonuniform branching distributions are not very sensitive to the copolymer composition and usually are in the 125–128° C. range.

If an LLDPE resin is compositionally uniform, all its macromolecules crystallize equally poorly due to the branching. They form very thin lamellae. Such materials have very low rigidity (low modulus) and are very flexible. Optical properties of LLDPE also strongly depend on the degree of their branching uniformity. The metallocene LLDPE make highly transparent film with haze as low as 3%–4%, and for recently developed Exxon grades, even much lower, 0.3%–0.5%. In contrast, the haze level of film produced for a nonuniform branched conventional LLDPE is over 15–20%.

A number of polymer materials with a very attractive combination of properties not available before (high tacticity, very uniform comonomer distribution along the molecular chains, precise MW, narrow MWD, relatively low melting point, low temperature impact properties, extremely high clarity, etc.) have thus been developed. For example, a new generation of polyethylene with substantially different properties, made by the use of metallocene catalysts has been commercialized. These newly developed plastomers and elastomers, polymerized using metallocene catalyst systems, offer the possibility of obtaining unique combinations of properties required for sealing and wrapping applications.

There is a need for a film which is crystal clear and can be stretched without tearing to create a leak proof seal and which has excellent resistance to a wide range of chemicals. This is especially true in clinical and industrial research and in process applications requiring a custom seal or closure.

SUMMARY OF THE INVENTION

It is therefore an objective of this invention to provide a sealing and wrapping film product having improved properties, such as, higher clarity, excellent tackiness at elevated, ambient and very low (cryogenic) temperatures, high chemical resistance, and whose cost to the user will be comparable to currently known seal and wrapping films. The present invention is directed to blends of metallocene catalyzed olefin polymers which are processed into films having these desired properties for sealing and wrapping applications.

The polymer compositions of the present invention are blends of metallocene catalyzed polyethylene plastomers (component A) having a density of at least 0.900 g/ccm and metallocene catalyzed polyethylene elastomers (component B) having a density lower than 0.900 g/ccm. Compositions comprising components A and B which are blended in a weight ratio range of from about 70% to 30% (A:B 70/30) to about 97% to 3% (A:B 97/3); preferably from about A:B 80%/20% to about 95%/5%; and most preferably from A:B about 90%/10% to about 95%/5%, achieve the goal of this invention, i.e., to combine the excellent stretchability, tensile strength and elongation at break of metallocene plastomers, with the softness, tackiness and mechanical recovery properties of metallocene elastomers.

These optimal ratio ranges between the two resins in the blend assure an excellent quality product having the desired characteristics of stretchability, high elongation at break, relatively low modulus, high tear resistance, high clarity, very low glass transition point; tackiness to various surfaces at elevated, ambient and cryogenic temperatures, and high chemical resistance which are required for sealing and wrapping applications in food, medical and other industries.

The method of producing these films comprises selecting a metallocene catalyzed thermoplastic polyethylene plastomer having a density of at least 0.900 g/ccm; selecting a metallocene catalyzed polyethylene elastomer having a density lower than 0.900 g/ccm; blending the plastomer and the elastomer in a ratio range of from about 70% to 97% by weight plastomer to about 3 to about 30% by weight elastomer; and forming the film by way of conventional film manufacturing methods such as casting extrusion, blown extrusion and twin screw extrusion.

The compositions and resultant films may further comprise other metallocene catalyzed olefin polymers and copolymers either, in place of, or, in addition to, the polyethylene plastomers and elastomers as well as pigments, dies, colorants, nucleants, U.V. blockers, stabilizers and other well known additives utilized in film and thermoplastic productions.

The present invention offers a more versatile, secure seal with enhanced functionality at comparable cost to the PARAFILM® and DURASEAL™ products. Specifically, when compared to the PARAFILM® wax-impregnated polyethylene, the present invention dramatically improves clarity for visual inspection with the seal in place; has chemical resistance to solvents commonly used in laboratories such as alcohols and ketones; has higher temperature capabilities; has biocapabilities for life science applications as determined by in vitro cytotoxicity models using the L929, MRC-5 and Vero cells; has lower gas permeability to aid in problems associated with flash-off of volatiles and has higher tear resistance. It is odor free and waterproof since the water absorption after 24 hours is less than 0.01%.

Compared to DURA-SEAL™ conventional LLDPE type-film the present invention offers the following advantages: a tacky surface for significantly better sealing; less haze, greater clarity; reduced environmental stress cracking; increased safety since breakage can occur when a tougher, less pliable film is stretched too hard over glass; better Dart Impact Resistance; and approval for food contact since it complies with FDA Regulation 21 CFR 1777.1520 (A) (3) (i) (d).

DESCRIPTION OF THE PREFERRED EMBODIMENT

Metallocene polymers are understood to be manufactured from the same monomers used to obtain conventional olefin polymers and copolymers, but using a metallocene catalyst. This produces very low density polymers that have attractive properties. It is understood that olefin homopolymers are referred to as "plastomers" and those with a copolymerized monomer (of the type that would usually yield an elastomer such as a diene) are referred to as "elastomers". According to the ASTM usage and technical literature, polyethylene (PE) plastomers are defined as very low density PE groups of resins with low crystallinity, 10–20%, and densities in the 0.915–0.900 g/ccm range. PE elastomers are defined as completely amorphous thermoplastics with densities as low as 0.860 g/ccm.

The plastomer component A, according to the present invention, provides high clarity, low modulus and excellent stretchability of film. The elastomer component B is incorporated into the formulation to increase the tackiness of the product in a very wide range of temperatures from plus 85°–90° C. to minus 50°–85° C.; to decrease the glass transition point; to improve the mechanical properties at very low temperatures; to reduce the force required to stretch the film during the seal application; and to increase the mechanical recovery, i.e., the sealability of film.

Other metallocene catalyzed olefin polymers and copolymers may be substituted for or added to the composition of the metallocene catalyzed polyethylene plastomers and elastomers of the present composition. Additives such as pigments and dies to produce a colored film, nucleation agents to stabilize the submolecular structure of the film, UV blocking agents, stabilizers, etc. can be incorporated into the formulation without changing the main properties and application of the product.

The film product, according to the present invention, can be manufactured using conventional film manufacturing technologies, both casting extrusion and blown extrusion can be used. The resin can be produced by dry blending of pellets of the two components in convnental mechanical mixers. The well known state-of-the-art melt compounding technique using a twin screw extruder can be implemented if an additional improvement of the mixing uniformity is desired, or to improve the additives distribution in the polymer matrix. However, this additional technological stage is not required to produce a high quality product of blends of plastomers and elastomers for general applications.

Many grades of metallocene-based olefin copolymers such as linear ethylene plastomers, known as Exxon "EXACT®" family of metallocenes PE plastomers and Dow "AFFINITY®" family of PE metallocenes plastomers can be used as component A. These include "EXACT®" plastomers 3001, 3033, 3024, 3025, etc. from Exxon and "AFFINITY®" grades PL 1880, PL 1845, SM 1300, SM 1350, etc. from Dow.

Metallocene olefin copolymers such as PE elastomers known as Dow "ENGAGE®" family of metallocene PE elastomers and Exxon "EXACT®" grades of metallocene elastomer resin can be used as component B. "EXACT®" grades of elastomer resin 4011, 4049, etc. from Exxon, and elastomer "ENGAGES" KC 8852, EG 8150, etc. from Dow are examples of component B. Properties of some metallocenes LLDPE plastomers and elastomers are given in Table 1.

TABLE 1

Properties of some metallocenes LLDPE plastomers and elastomers

| Polymer Family, grade | Density g/ccm | DSC Tm C | Tensile strength MD/TD Psi | Elongation at break, MD/TD % | Impact resistance g/mil | Haze % |
|---|---|---|---|---|---|---|
| Exxon Exact Resin: | | | | | | |
| 3024 | 0.905 | 98 | 6900/3960 | 390/660 | 167 | 0.5 |
| 3001 | 0.910 | 101 | 6110/4140 | 480/650 | 189 | 0.5 |
| 3026 | 0.905 | 101 | 8320/4680 | 420/710 | 416 | 0.5 |
| 3033 | 0.900 | 94 | 9800/9020 | 470/580 | 1125 | 2.9 |
| 3025 | 0.910 | 103 | 8140/5680 | 640/660 | 1050 | 3.7 |
| 4011 | 0.885 | 66 | 3260/3260 | 800/800 | 350 | 0.4 |
| 3028 | 0.900 | 92 | 8670/7250 | 590/680 | 177 | 3.1 |
| 4049 | 0.875 | 82 | 4670/4450 | 690/780 | 345 | 0.3 |
| Dow Affinity Resin: | | | | | | |
| PL 1880 | 0.902 | 100 | 7170/3800 | 570/560 | 500 | 1.1 |
| PL 1845 | 0.910 | 103 | 6580/4870 | 527/660 | 362 | 0.7 |
| Dow Engage Resin: | | | | | | |
| KC 8852 | 0.875 | 79 | 4600/4900 | 890/850 | 150 | 0.5 |
| EG 8150 | 0.868 | 62 | 1600/1750 | 880/790 | 450 | 0.4 |

Generally the blends of metallocene plastomers and elastomers of different grades are made by combining them in a dry mechanical mixer of any type for about 10–20 min. at room temperature. Even a simple tumbling in a plastic bag is acceptable for mixing of two polymers if a mechanical mixer is not available.

A melt mixing process can also be used. In this case, the polymer components can be premixed in a dry mechanical mixer and loaded into the twin-screw extruder, molten in there, extruded into strands and cut (pelletized) into uniform pellets. However, this is not required to obtain a good quality film product due to the acceptable mixability of the two metallocene polymers in one stage, i.e., in the single screw extruder. Even color concentrates, pigments and other additives can be incorporated into the formulation by the dry mixing technology using a mechanical mixer, without melt mixing of the components. The melt mixing occurring in the film extruder provides an acceptable quality of components and additives distribution.

In the present invention, the well known Henshel type high speed dry mixer is utilized. Components (A) and (B), in appropriate quantities, are loaded into the mixer. The mixer is started up and works at the speed of 300 RPM. Mixing of the batch for 10–15 min. is sufficient to get an adequate mix of the dry pellets of the two components. The mixture of the pellets is loaded into the hopper of the film extrusion line, molten in the single screw extruder, and extruded into a film. A 40 lb. mixer was utilized, however, a larger or smaller mixer can also be used.

The film extrusion line contains a single screw extruder produced by Davis Standard Corp. (Ct. USA), a flat casting extrusion die 54" wide, and a roll stock dawn stream unit to take-up and cool the final film. The extruder contains a screw of a usual design for processing of polyolefins. The screw has a diameter 2" and a relative length of 24 diameters, i.e., the length/diameter ratio is L/D=24. The compression ratio of the screw is 4:1. The screw is rotating in the barrel of the same length. The barrel is heated with outside electrical heaters. Temperatures of the barrel sections are maintained in the following ranges:

| | |
|---|---|
| Zone 1 (feeding section) | from 100° C. to 130° C.; |
| Zone 2 (melting section) | from 130° C. to 170° C.; |
| Zone 3 (plastisizing section) | from 160° C. to 200° C.; |
| Zone 4 (metering or discharge section) | from 180° C. to 235° C. |

The melt from the extruder is discharged into the flat casting extrusion die 54" wide and formed into a flat film web, which is taken, calibrated and cooled by the two roll casting unit. Temperature of the extrusion die is kept in the range from 180° C. to 235° C. The temperature of the upper roll is from 90° C. to 135° C.; the temperature of the bottom roll is from 55° C. to 850° C. The cooled film is wound in a roll, and then slit to the required width and length. In most cases, the final product is slit into a 4" wide tape and wound on 3" cores in small rolls, 150 ft. long.

Temperatures of the extruder barrel, die, and casting rolls depend on the formulation. The higher the content of the elastomer with low density and low melting point, the lower are the processing temperatures. The lower level of all temperatures is given for a formulation containing 30% of the elastomer. The highest level of all temperatures is given for a formulation containing 3% of the elastomer. Temperatures for all other formulations are between the above lower and higher ranges.

Blends of metallocene polyethylene plastomer with density of at least 0.900 g/ccm and metallocene polyethylene elastomer with density lower than 0.900 g/ccm in weight ratios of from about 70%:30% to 97%:3% achieve the goal of combining the excellent stretchability, tensile strength and elongation at break of metallocene plastomer with the softness, tackiness and mechanical recovery properties of metallocene elastomer.

The present invention provides a long term or temporary seal that is secure and allows visual inspection. It has excellent resistance to a wide range of chemicals and has been tested and found to be non-toxic to virtually all cell lines as determined by in vitro cytotoxicity models using the L 929, MRC-5 and Vero cells. It is very tough and can be stretched without tearing to create leak proof seals. It is odor free and does not crack, even at very low temperatures. It is ideal for environmental analysis and meets FDA criteria for contact with food.

The optimal ratio of the resins in the blend assures an excellent quality product. If the content of the plastomer is too high (i.e., the content of the elastomer is too low) the film has a high tensile strength and elongation at break but the cling properties (tackiness and mechanical recovery) of the film are not good enough to provide a tight seal. If the content of the plastomer is too low (i.e., the content of the elastomer is too high) the film has lower tensile strength, very high stretchability, and lower use temperature. In addition, the tackiness of film becomes so high that it is practically impossible to use the film. It would be difficult for users to even unwind the film, in other words, the "handleability" of the film would be very poor.

EXAMPLES

The following examples of embodiments of the invention can be used for specific illustration of the above. These examples and comparative examples are given to illustrate the invention in more detail and are not intended to be limiting.

Comparative Example 1

Approximately 40 pounds of pellets of Dow elastomer, "ENGAGE" KC 8852 with a density of 0.875 g/ccm (ASTM D-1505) and melt flow rate of 3.0 g/10 min. (ASTM D-1238) were loaded into the hopper of the film extruder line, moltened in the single screw extruder and extruded into a film.

The "handleability" of this film was very poor. The film stuck to itself and "blocked" on the roll. It was impossible to unwind the roll and slit the film. This film was not practically usable. Properties of this film are listed below in Table 2.

Example 2

Approximately 20 pounds of pellets of Exxon "EXACT 3033" plastomer having a density of 0.900 g/ccm (measured according to ASTM D-1505) and a melt flow rate of 1.2 g/10 min. (measured according to ASTM D-1238) were mixed with 20 pounds of pellets of Dow elaster ENGAGE KC 8852 having a density of 0.875 g/ccm (ASTM D-1505) and a melt flow rate of 3.0 g/10 min. (ASTM D-1238) in a 40 lb. dry V-blender for 12 min. followed by film extrusion using the 2" Davis Standard extruder equipped with a 54" wide flat casting extrusion die. A 1.5 mil thick film 48" wide was produced. The film web was attempted to be rewound and slit but the film blocked on the roll. The final product was evaluated as a sealing and wrapping film. Properties of this film are listed below in Table 2. It also has very poor handleability properties.

Example 3

Approximately 24 pounds of pellets of Exxon "EXACT 3033" plastomer having a density of 0.900 g/ccm (measured according to ASTM D-1505) and a melt flow rate of 1.2 g/10 min. (measured according to ASTM D-1238) were mixed with 16 pounds of pellets of Dow elaster ENGAGE KC 8852 having a density of 0.875 g/ccm (ASTM D-1505) and a melt flow rate of 3.0 g/10 min. (ASTM D-1238) in a 40 lb. dry V-blender for 12 min. followed by film extrusion using the 2" Davis Standard extruder equipped with a 54" wide flat casting extrusion die. A 1.5 mil thick film 48" wide was produced. The film web then was attempted to be rewound, slit into a tape 4" wide and wound into 150 ft. rolls. The final product was evaluated as a sealing and wrapping film. Properties of this film are listed below in Table 2. The film stretched during unwinding and is likely to be inconvenient for users as far as "handleability" is concerned.

Example 4

Approximately 28 pounds of pellets of Exxon "EXACT 3033" plastomer having a density of 0.900 g/ccm (measured according to ASTM D-1505) and a melt flow rate 1.2 g/10 min. (measured according to ASTM D-1238) were mixed with 12 pounds of pellets of Dow elaster ENGAGE KC 8852 having a density of 0.875 g/ccm (ASTM D-1505) and melt flow rate of 3.0 g/10 min. (ASTM D-1238) in a 40 lb. dry V-blender for 12 min. followed by film extrusion using the 2" Davis Standard extruder equipped with a 54" wide flat casting extrusion die. A 1.5 mil thick film 48" wide was produced. The film web then was attempted to be rewound, slit into a tape 4" wide and wound into 150 ft. rolls. The final product was evaluated as a sealing and wrapping film. Properties of this film are listed below in Table 2. The film was usable; however, handling of the film is inconvenient due to the relative high force and stretching of film required to "unblock" the layers on the roll during the unwinding.

Example 5

Approximately 32 pounds of pellets of Exxon "EXACT 3033" plastomer having a density of 0.900 g/ccm (measured according to ASTM D-1505) and a melt flow rate 1.2 g/10 min. (measured according to ASTM D-1238) were mixed with 8 pounds of pellets of Dow elaster ENGAGE KC 8852 having a density of 0.875 g/ccm (ASTM D-1505) and a melt flow rate 3.0 g/10 min. (ASTM D-1238) in a 40 lb. dry V-blender for 12 min. followed by film extrusion using the 2" Davis Standard extruder equipped with a 54" wide flat casting extrusion die. A 1.5 mil thick film 48" wide was produced. The film web was rewound, slit into a tape 4" wide and wound into 150 ft. rolls. The final product was evaluated as a sealing and wrapping film. Properties of this film are listed below in Table 2. The "handleability" of this film was good.

Example 6

Approximately 36 pounds of pellets of Exxon "EXACT 3033" plastomer having a density of 0.900 g/ccm (measured according to ASTM D-1505) and a melt flow rate of 1.2 g/10 min. (measured according to ASTM D-1238) were mixed with 4 pounds of pellets of Dow elaster ENGAGE KC 8852 having a density of 0.875 g/ccm (ASTM D-1505) and a melt flow rate 3.0 g/10 min. (ASTM D-1238) in a 40 lb. dry V-blender for 12 min. followed by film extrusion using the 2" Davis Standard extruder equipped with a 54" wide flat casting extrusion die. A 1.5 mil thick film 48" wide was produced. The film web was rewound, slit into a tape 4" wide and wound into 150 ft. rolls. The final product was evaluated as a sealing and wrapping film. Properties of this film are listed below in Table 2. This film had excellent "handleability" without blocking. It was easy to unwind and use. It had consistent dimension stability and did not stretch during the unwinding.

Example 7

Approximately 36.8 pounds of pellets of Exxon "EXACT 3033" plastomer having a density of 0.900 g/ccm (measured according to ASTM D-1505) and a melt flow rate 1.2 g/10 min. (measured according to ASTM D-1238) were mixed with 3.2 pounds of pellets of Dow elaster ENGAGE KC 8852 having a density of 0.875 g/ccm (ASTM D-1505) and a melt flow rate of 3.0 g/10 min. (ASTM D-1238) in a 40 lb. dry V-blender for 12 min. followed by film extrusion using the 2" Davis Standard extruder equipped with a 54" wide flat casting extrusion die. A 1.5 mil thick film 48" wide was produced. The film web was rewound, slit into a tape 4" wide and wound into 150 ft. rolls. The final product was evaluated as a sealing and wrapping film. Properties of this film are listed below in Table 2. This film had excellent handleability without blocking. It was easy to unwind and use. It had consistent dimensional stability and did not stretch during the unwinding.

Example 8

Approximately 38 pounds of pellets of Exxon "EXACT 3033" plastomer having a density of 0.900 g/ccm (measured according to ASTM D-1505) and a melt flow rate of 1.2 g/10 min. (measured according to ASTM D-1238) were mixed with 2 pounds of pellets of Dow elaster ENGAGE KC 8852 having a density of 0.875 g/ccm (ASTM D-1505) and a melt flow rate of 3.0 g/10 min. ASTM D-1238) in a 40 lb. dry V-blender for 12 min. followed by film extrusion using the 2" Davis Standard extruder equipped with a 54" wide flat casting extrusion die. A 1.5 mil thick film 48" wide was produced. The film web was rewound, slit into a tape 4" wide and wound into 150 ft. rolls. The final product was evaluated as a sealing and wrapping film. Properties of this film are listed below in Table 2. This film had excellent "handleability" without blocking. It was easy to unwind and use. It had consistent dimension stability and did not stretch during the unwinding.

Example 9

Approximately 38.8 pounds of pellets of Exxon "EXACT 3033" plastomer having a density of 0.900 g/ccm (measured according to ASTM D-1505) and a melt flow rate of 1.2 g/10 min. (measured according to ASTM D-1238) were mixed with 1.2 pounds of pellets of Dow elaster ENGAGE KC 8852 having a density of 0.875 g/ccm (ASTM D-1505) and a melt flow rate of 3.0 g/10 min. (ASTM D-1238) in a 40 lb. dry V-blender for 12 min. followed by film extrusion using the 2" Davis Standard extruder equipped with a 54" wide flat casting extrusion die. A 1.5 mil thick film 48" wide was produced. The film web was rewound, slit into a tape 4" wide and wound into 150 ft. rolls. The final product was evaluated as a sealing and wrapping film. Properties of this film are listed below in Table 2. This film had excellent "handleability" without blocking. It was easy to unwind and use. It had consistent dimension stability and did not stretch during the unwinding.

Example 10

Approximately 39.6 pounds of pellets of Exxon "EXACT 3033" plastomer having a density of 0.900 g/ccm (measured according to ASTM D-1505) and a melt flow rate of 1.2 g/10 min. (measured according to ASTM D-1238) were mixed with 0.4 pounds of pellets of Dow elaster ENGAGE KC 8852 having a density of 0.875 g/ccm (ASTM D-1505) and a melt flow rate 3.0 g/10 min. (ASTM D-1238) in a 40 lb. dry V-blender for 12 min. followed by film extrusion using the 2" Davis Standard extruder equipped with a 54" wide flat casting extrusion die. A 1.5 mil thick film 48" wide was produced. The film web was rewound, slit into a tape 4" wide and wound into 150 ft. rolls. The final product was evaluated as a sealing and wrapping film. Properties of this film are listed below in Table 2. This film had excellent "handleability" without blocking. It was easy to unwind and use. It had consistent dimension stability and did not stretch during the unwinding.

Comparative Example 11

Approximately 40 pounds of pellets of Exxon "EXACT 3033" plastomer having a density of 0.900 g/ccm (measured according to ASTM D-1505) and a melt flow rate of 1.2 g/10 min. (measured according to ASTM D-1238) were loaded into the hopper of the film extruder line, moltened in the single screw extruder and extruded into a film. A 1.5 mil. thick film 48" wide was produced. The film web was rewound, slit into a tape 4" wide and wound into 150 ft. rolls. The final product was evaluated as a sealing and wrapping film. Properties of this film are listed below in Table 2. Although the handleability of this film was excellent, the amount of haze was high and the tensil strength was not as strong as most of the other samples. The "R" value was less than 70%, therefore, the cling and sealing properties were not assured.

Comparative Example 12

Competitive product, PARAFILM®, was evaluated as a seal and wrapping film and compared to the films of Examples 1 to 11. The properties are listed below in Table 2.

Comparative Example 13

Competitive product DURASEAL™, was evaluated as a seal and wrapping film and compared to the films of Examples 1 to 11. The properties are listed below in Table 2.

TABLE 2

Properties of Film According to Examples 1–13

| Example ## | Ratio A:B — | Tensile strength PSI | Elongation at break % | Mechanical Recovery (R value) % | Haze % | Handle-ability (%) % |
|---|---|---|---|---|---|---|
| 1. | 0/100 | 1500 | 1000 | 92 | 0.5 | VP |
| 2. | 50/50 | 1000 | 1000 | 90 | 0.7 | VP |
| 3. | 60/40 | 900 | 900 | 88 | 1.0 | P |
| 4. | 70/30 | 850 | 900 | 85 | 1.2 | F |
| 5. | 80/20 | 820 | 900 | 83 | 1.6 | G |
| 6. | 90/10 | 800 | 870 | 82 | 2.2 | E |
| 7. | 92/8 | 800 | 850 | 80 | 2.3 | E |
| 8. | 95/5 | 780 | 835 | 78 | 2.6 | E |
| 9. | 97/3 | 750 | 800 | 75 | 2.7 | E |
| 10. | 99/1 | 700 | 700 | 70 | 2.9 | E |
| 11. | 100/0 | 650 | 700 | 66 | 3.2 | E |
| 12. | PARAFILM ® | 450 | 140 | 45 | Opaque | G |
| 13. | DURASEAL ™ | 550 | 700 | 60 | 5.9 | E |

* VP - Very Poor: the film stick to itself ("block" on the roll), and is impossible to unwind the roll and slit the film; practically not usable.
* P - Poor: blocking of the film is better than for VP, however the film is getting stretched during the unwinding, and it is very inconvenient for users.
* F - Fair: the film is usable, however, handling of film is inconvenient due to the relative high force and stretching of film required to "unblock" the layers on the roll during the unwinding.
* G - Good: the film is usable without blocking on the roll; considerable force is required to unwind the film, however the stretching of film during this process in insignificant.
* E - Excellent: excellent handleability without blocking, easy to unwind and use; consistent dimension stability, no stretching during the unwinding.

Tensile strength and elongation at break were measured according to ASTM D-638.

Use temperature was estimated by measuring the Vicat Softening Point at 1000 g load according to ASTM D-1525.

Haze was estimated according to the ASTM D-1003.

Seal and wrapping properties were estimated by measuring of the so called mechanical recovery after stretching. This procedure has not been standardized yet, and an in house developed testing procedure has been used. Norton's procedure of the sealability (stretching recovery) evaluation is described below. The procedure is based on the understanding that the seal of the edges of glass containers is obtained not by chemical adhesion of film to glass or plastic surfaces, but by mechanical recovery (elasticity or rubberish properties) of film. The film stretched over a container is recovering after stretching and seals the edges tightly.

To check the seal properties, a standard chemical beaker having a volume of 250 mL is filled up with 150 mL of water and sealed by stretching of film over the beaker edges. The sealed beaker with water is turned upside-down and left for 10 days in this position. The seal properties of film are considered to pass the test if no water leaks from the beaker immediately and/or after 10 days. As a result of a number of experiments, it was found that a reliable seal of a chemical beakers and other containers can be achieved only if the film has an elasticity (mechanical recovery after stretching) not less that 70%. The following procedure of quantitative measurement of the stretching recovery of film has been developed.

A sample of film tape 6" (150 mm) long and 1" (25 mm) wide was cut from the film web. This sample was clamped in the dies (holders) of a standard tensile machine (in this case, model Instron 1445). The moving clamp was activated and moved with the speed 2" per minute (50 mm/min.) until the film sample had been stretched to the length of 12" (300 mm), i.e., the elongation of the sample reaches 100%. The film was released from the moving clamp and started to recover (shrink in the length). The length of the sample was measured after 1 (one) minute of free recovery. The elastic recovery was calculated using the following formula:

$$R = [(L_s - L_r)/(L_s - L_o)] \times 100\%$$

Where:

L_o—is the initial length before stretching (in this case 6");

L_s—is the length of the stretched film (in this case 12");

L_r—is the length of the film sample after 1 minute of the free recovery

A "R" value higher than 70% assures good cling and seal properties of the product.

The following conclusions can be made from analysis of the data shown in Table 2. The mechanical recovery (elasticity), i.e., the sealability of the film is 70% and higher for film made of formulations with the ratio of components (A) and (B) in the range from 70%/30% to 99%/1%. Film made of blends with the ratios of components beyond this region are not meeting the R value required to provide a reliable seal of glass and plastic containers. The preferable A:B ratio if from 70%/30% to 97%/3%; the more preferable is from A:B ratio in the range from 80%/20% to 95%/5%; and the most preferable A:B ratio is in the range from 90%/10% to 95%/5%.

Formulations within the above ratios exhibit a combination of excellent performance and workability. There should be no sticking problems for users. The product made of formulations of the present invention has a better performance (higher recovery required for a durable and reliable seal), higher tensile strength and elongation at break, and higher clarity than competitive products.

The properties of an embodiment of the present invention are given in Table 3 in comparison to the properties of the competitive products being currently used in the industry. Data showing the chemical resistance of these products is presented in Table 4.

TABLE 3

|  | INVENTION | PARAFILM ® | DURASEAL ™ |
| --- | --- | --- | --- |
| Seal Integrity | E | G | E |
| Ease of Sealing | E | E | G |
| Clarity | E | P | G-hazes when stretched |
| Chemical Resistance | E | P | E |
| Environmental Stress Cracking | E | P | G |
| Tear Resistance/Dart Impact Resistance | E | P | G |
| Biocompatibility | E | Unknown | Unknown |
| FDA Complaint | E | Unknown | Unknown |
| Service Temperature Range | Minus 70° C. to Plus 90° C. | Minus 70° C. to Plus 68° C. | Minus 70° C. to Plus 100° C. |

E = Excellent
G = Good–Fair
F = Fair
P = Poor

TABLE 4

Chemical Resistance of Competitive Sealing Films

| Chemical | INVENTION | DURASEAL ™ | PARAFILM ® |
| --- | --- | --- | --- |
| Distilled water | Y | Y | Y |
| Methanol | Y | Y | Y |
| Hydrochloric Acid | Y | N | Y |
| Ammonium Hydroxide | Y | N | Y |
| Methylene Chloride | Y | N | N |
| Acetone | Y | N | Y |
| Toluene | Y | N | N |
| Tetrahydrofuran | Y | N | N |

Competitive films were tested for sealing performance at 73° F. for 72 hours. Sealing materials were used to seal beakers containing the chemicals listed in the left column. "Y" indicates seal is still in place at the end of 72 hours; "N" indicates that the seal released or cracked.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A film comprising a blend of:

(A) a metallocene catalyzed polyethylene plastomer having a density of 0.900 to 0.915 g/ccm and having a crystallinity of less than 25% according to ASTM D 1248, and (B) a metallocene catalyzed polyethylene elastomer having a density lower than 0.900 g/ccm and having an amorphous structure wherein (A) and (B) are blended in a ratio of from 70 wt % to 97 wt % A to 3 wt % to 30 wt % B, the film having an elasticity of greater than 70%.

2. The film of claim 1 further comprising an additive selected from the group consisting of pigments, dies, colorants, nucleants, U.V. blockers and stabilizers.

3. The film of claim 1 wherein A and B are blended in a ratio of from about 80 wt % to 95 wt % A to 5 wt % to 20 wt % B.

4. The film of claim 1 wherein A and B are blended in a ratio of from about 90 wt % to 95 wt % A to 5 wt % to 10 wt % B.

5. The film of claim 3 further comprising an additive selected from the group consisting of pigments, dies, colorants, nucleants, U.V. blockers and stabilizers.

6. The film of claim 4 further comprising an additive selected from the group consisting of pigments, dies, colorants, nucleants, U.V. blockers and stabilizers.

7. An article wrapped or sealed using the film of claim 1 as a sealing and wrapping material.

8. An article wrapped or sealed using the film of claim 2 as a sealing and wrapping material.

9. An article wrapped or sealed using the film of claim 3 as a sealing and wrapping material.

10. An article wrapped or sealed using the film of claim 4 as a sealing and wrapping material.

11. An article wrapped or sealed using the film of claim 5 as a sealing and wrapping material.

12. An article wrapped or sealed using the film of claim 6 as a sealing and wrapping material.

\* \* \* \* \*